(12) United States Patent
Mendelson (10) Patent No.: US 9,374,673 B2
(45) Date of Patent: Jun. 21, 2016

(54) SYSTEM AND METHOD UTILIZING INTEGRAL WIRELESS PROTOCOLS OF A MOBILE PHONE AS AN EMERGENCY BEACON TO AID FIRST RESPONDERS IN LOCATING PEOPLE

(76) Inventor: Ehud Mendelson, Coral Springs, FL (US)

(*) Notice: Subject to any disclaimer, the term of this patent is extended or adjusted under 35 U.S.C. 154(b) by 187 days.

(21) Appl. No.: 13/135,421

(22) Filed: Jul. 5, 2011

(65) Prior Publication Data

US 2012/0064855 A1    Mar. 15, 2012

Related U.S. Application Data

(62) Division of application No. 12/932,811, filed on Mar. 7, 2011, now Pat. No. 8,941,485, which is a division of application No. 12/069,899, filed on Feb. 13, 2008, now Pat. No. 7,924,149, which is a division of application No. 11/472,706, filed on Jun. 22, 2006, now Pat. No. 8,896,485, which is a division of application No. 11/429,864, filed on May 8, 2006, now Pat. No. 8,836,580.

(60) Provisional application No. 60/678,947, filed on May 9, 2005.

(51) Int. Cl.
| | |
|---|---|
| H04M 11/04 | (2006.01) |
| H04W 4/04 | (2009.01) |
| G01C 21/20 | (2006.01) |
| G01S 1/68 | (2006.01) |
| G01S 5/02 | (2010.01) |
| G06Q 30/02 | (2012.01) |
| G06Q 90/00 | (2006.01) |
| G08B 7/06 | (2006.01) |

(52) U.S. Cl.
CPC ............ *H04W 4/04* (2013.01); *G01C 21/206* (2013.01); *G01S 1/68* (2013.01); *G01S 5/02* (2013.01); *G01S 5/0226* (2013.01); *G06Q 30/0239* (2013.01); *G06Q 90/20* (2013.01); *G08B 7/066* (2013.01)

(58) Field of Classification Search
CPC ...... H04W 4/22; H04W 76/007; H04W 64/00
USPC .......... 455/404.2, 404.1, 414.1, 456.1, 456.3, 455/574, 41.2
See application file for complete search history.

(56) References Cited

U.S. PATENT DOCUMENTS

| | | |
|---|---|---|
| 4,491,970 A | 1/1985 | LaWhite et al. |
| 5,195,126 A | 3/1993 | Carrier et al. |

(Continued)

*Primary Examiner* — Nghi H Ly
(74) *Attorney, Agent, or Firm* — Allen D. Hertz, P.A.; Allen D. Hertz (57) ABSTRACT

A system and method that employs features of a user's cellular phone to emit an emergency beacon to aid first responders search and rescue units or emergency personal in locating a person experiencing an emergency condition. The system includes a process for identifying a location of the user's cellular phone independent of functionality of a Global Positioning System (GPS) by determining the location of the user's cellular phone by using locating beacon signals emitted from locating beacons deployed in a vicinity of the person. The user's cellular phone can be adapted to emit an emergency beacon signal. The emergency beacon signal can include emergency information in a naming portion thereof when the emergency beacon signal is transmitted using Bluetooth and/or Wi-Fi protocols. The emergency information can include location information.

37 Claims, 6 Drawing Sheets

(56) References Cited

U.S. PATENT DOCUMENTS

| | | | |
|---|---|---|---|
| 5,305,370 A | 4/1994 | Kearns et al. | |
| 5,568,535 A | 10/1996 | Sheffer et al. | |
| 5,652,570 A | 7/1997 | Lepkofker | |
| 5,712,619 A | 1/1998 | Simkin et al. | |
| 5,742,233 A | 4/1998 | Hoffman et al. | |
| 5,771,001 A | 6/1998 | Cobb | |
| 5,838,237 A | 11/1998 | Revell et al. | |
| 5,873,040 A | 2/1999 | Dunn et al. | |
| 5,929,777 A * | 7/1999 | Reynolds | 340/8.1 |
| 5,971,921 A | 10/1999 | Timbel | |
| 6,072,396 A | 6/2000 | Gaukel | |
| 6,340,928 B1 | 1/2002 | McCurdy | |
| 6,535,127 B1 | 3/2003 | Taylor | |
| 6,636,732 B1 | 10/2003 | Boling et al. | |
| 6,807,564 B1 | 10/2004 | Zellner et al. | |
| 7,907,931 B2 * | 3/2011 | Hartigan et al. | 455/404.2 |
| 8,041,330 B1 * | 10/2011 | Garin | 455/404.1 |
| 8,126,960 B2 * | 2/2012 | Obradovich et al. | 709/203 |
| 2001/0026223 A1 | 10/2001 | Menard et al. | |
| 2003/0034881 A1 * | 2/2003 | Linnett et al. | 340/309.15 |
| 2003/0050039 A1 * | 3/2003 | Baba et al. | 455/404 |
| 2003/0087628 A1 * | 5/2003 | Michibata | 455/404 |
| 2004/0072583 A1 * | 4/2004 | Weng | 455/456.3 |
| 2004/0239498 A1 * | 12/2004 | Miller | 340/539.13 |
| 2005/0070315 A1 * | 3/2005 | Rai et al. | 455/466 |
| 2005/0111630 A1 * | 5/2005 | Potorny et al. | 379/45 |

\* cited by examiner

FIG. 2

Scanning4life Scanning procedure — 200

SYSTEM AND METHOD UTILIZING INTEGRAL WIRELESS PROTOCOLS OF A MOBILE PHONE AS AN EMERGENCY BEACON TO AID FIRST RESPONDERS IN LOCATING PEOPLE

RELATED APPLICATIONS

This application is a Divisional patent application claiming the benefit of U.S. patent application Ser. No. 12/932,811 filed on Mar. 7, 2011 now U.S. Pat. No. 8,941,485, which is a Divisional patent application claiming the benefit of U.S. patent application Ser. No. 12/069,899, filed on Feb. 13, 2008 (Issued as U.S. Pat. No. 7,924,149 on Apr. 12, 2011), which is a Divisional patent application claiming the benefit of U.S. patent application Ser. No. 11/472,706, filed on Jun. 22, 2006 (Issued as U.S. Pat. No. 8,896,485 on Nov. 25, 2014), which is a Divisional patent application claiming the benefit of U.S. patent application Ser. No. 11/429,864, filed on May 8, 2006 (Issued as U.S. Pat. No. 8,836,580 on Sep. 16, 2014), which claims the benefit of U.S. Provisional Patent Application Ser. No. 60/678,947, filed on May 9, 2005.

FIELD OF THE INVENTION

This invention is directed generally to the field of rescue and emergency and, more particularly, to methods \used indoors or outdoors in cases of emergency aid in searching and finding building occupants or people trapped in rubble or collapsed buildings due to disaster or an emergency situation.

BACKGROUND OF THE INVENTION

The present invention enhances the capability of research and rescue personal to search/scan a disaster or emergency area for people that may be trapped and looking for help by scanning and locating the most likely device that they all carry—a mobile phone. The disclosed system intends to be used in an environment that is potentially much less "friendly" than normal and more demanding as proof over and over in most emergency situations when the cellular network fail.

From the outset, the disclosed system has been designed with the capability to utilize existing technology so it can be deployed as a stand-alone system, or in tandem with existing systems. The disclosed system focuses on technology already in place that simply needs to be expanded.

It is believed that implementation of the disclosed system will assist search and rescue teams as well as counter terrorism activities and more importantly will provide additional tools that may help the first response teams to search and rescue people trapped inside buildings or in an emergency disaster area especially when you need to pin point and locate the people where the cellular infrastructure fails, the disclosed system can save lives.

The fact is that mobile phones are the most carried electronics devices. It is estimated that soon there will be more mobile phones than people in the world and most people carry mobile cell phones all the time.

Although there has been much effort by cellular companies after Sep. 11, 2001 (9/11), tracing for people calling E-911 from cell phone results in an accuracy of 300-1000 meters and fails the requirement set by the FCC, and that's when the infrastructure and the cellular communication are still in working order.

During recent emergencies including Sep. 11, 2001 (9/11) the cell phone network went down and many cell phones calls and messages could not go through because of the huge demand, in most emergency or disaster situations the cellular communication failure or damage.

It is widely estimated that many people still survive catastrophic disasters like recent earthquakes and terrorist events such as Sep. 11, 2001 (9/11) but are trapped inside the rubble without the ability to communicate or use their mobile phones to call for rescue.

Wake-Up Calls:

The Sep. 11, 2001 (9/11) terrorist attacks on the World Trade Center and the Pentagon, the Madrid bombings, the London bombings, the New York subway failure and the Virginia Tech event, recent earthquakes, and tornado disasters demonstrated the weaknesses and failures of the existing cellular communications infrastructure especially when a person needs it most.

On Sep. 11, 2001 (9/11), radio transmitters and cell sites including telecommunications infrastructure were damaged. Emergency personnel could not communicate in these challenging environmental conditions. There were tremendous gaps in command and control. Firefighters were cut off from critical communication because their radio systems failed. Many lives were lost and many people still alive couldn't be found.

"When the towers went down the cell sites were lost, as cell sites dropped, so did the communications"

Former NYC Police Commissioner quote.

The existing technical means to detect where mobile handsets are located are dependent on cellular towers and or GPS and active communication that again prove to be non-effective or damaged in an emergency.

And more, during the emergency and immediately after the emergency, even if the cellular network still works, a network congestion is likely to occur in many types of networks. In the aftermath of the emergency the elements of real-time and location may be crucial and the mobile phone can become useless when the telecommunications infrastructure is damaged.

Cell Phone Jamming:

Cell phone jamming devices were originally developed for law enforcement and the military to interrupt communications by criminals and terrorists that may rely on cell phones to trigger explosives. It has been widely reported that cellphone jammers are in use by law enforcements in emergency events made by man to temporarily cease operation of the cellular communication that the terrorist or criminals may be using.

So even if the cellular communication survives the man made emergency events, it most likely will still be useless.

And the most likely a reason there is no effective and practical solution is also:

The important of power—the battery power.

Battery Life is so important especially in an emergency hence in that situation when a phone can't find a good/or any signal, the phone will constantly look for a signal and will quickly drain the battery power doing so. This is easily understood if you have ever forgotten to turn off your phone on a flight.

Common wisdom says the best way to save battery life is to turn off the features you don't really need. In an emergency, the battery can be a life saver if you can save it, but it may be absurd that the best tip you can offer to increase the mobile phone staying power in an emergency is to not use it. To be more precise, not using the cell phone for cellular communication.

The proposed unique approach:

The proposed unique approach is to use the mobile phone as a device and not as a phone; in an emergency where the user will initiate an application on his mobile phone by pushing an emergency/panic/help button.

The application will allow the mobile phone to preserve the battery by entering the mobile phone into beacon like working mode to allow saving 4 to 5 times the battery power to allow the mobile phone to be found by first responders when they will arrive to the emergency/disaster area and start the search and rescue operation, the critical time known as a "golden day", the time you can still find people alive.

The disclosed innovation will allow encoding of a user ID into the handset naming to recognize or identify the user again without the need for cellular communication.

The search and rescue team will use an emergency scanner, a sensitive power scanner designed to pick up relatively weak signals coming from a mobile phone handset, ether cellular signal, Bluetooth, Wi-Fi, pinpoint to the location and allow decoding the user ID to identify the victim/trapped person.

The disclosed unique method to make the mobile phone a beacon will allow the victim/trapped person to preserve the mobile phone power at least 4 to 5 times over normal operation and will allow a victim/trapped person to show a sign of life and a way to be found and thus increase the "golden day" time to even days after an emergency or disaster event. In a way without preserving the battery it will not be practical at all.

The mobile phone can be a life saver, even if it will work in a different way than designed to and without cellular communication.

It can be an add-on tool to the first responders in any place in the world as well as an add-on tool to police or emergency units that try to locate people in case of emergency where the cellular and or the GPS are not available or not accurate.

Since there are more than 4 billion phones in use all over the world, most of which include a Bluetooth communication circuit, it seems obvious to include mobile devices and Bluetooth in public search and rescue operation systems.

Recent emergency situations teach us that the cellular communications in emergency situations are prone to crash due to the high volume of calls.

By using the disclosed method there is no need for the cellular communication at all, just the telephone device with the Bluetooth and or Wi-Fi and a way to preserve the battery power. The disclosed invention will use the signal coming from the device (the mobile phone) as a beacon for the user benefit in emergency.

The disclosed system uses the most used communication system that exists in almost all mobile phones, even the oldest mobile phones; the Bluetooth protocol.

Cost: The system is not prohibitively expensive.

Deployment: The disclosed system relies on technology that is already widely available and in use today, it can serve as add-on to the current equipments use by search and rescue unites around the world, moreover it can be used for other emergency situations where the user is in distress and needs to be found in proximity.

Scanning and identifying people in proximity for emergency use can be set for use in a non-emergency situation like "a black box in a room" or only in an emergency situation.

Do to the accuracy needed and the location (can be indoors) the GPS can't provide a solution. GPS accuracy is only 200-300' when a signal is available, and you can't accurately locate people in an indoor location.

The same is true for cellular network providers, as the accuracy is also 200-300', and only when a cellular signal is available, (problem indoor) and could be a problem when you need it most: in an emergency situation when most of the cellular network fails do to high demand or damage to the infrastructure.

By calculating the signals (triangulation method is one of them) coming from identifying distress mobile users we can achieve greater accuracy—less than 10 m.

The system can be an add-on to the E-911 and when you need to locate people in an emergency scenario in a close proximity area or when GPS and cellular can't provide the accuracy needed.

The mobile device was explored and considered for its capability to be used in an emergency. One of the options is to add to the mobile phone/beacon the ability to generate high frequency sound "dog whispering sound" that can be detected and alert the search and rescue dogs sensitive ear and the proposed device (sometimes referred to as "scanning4life") and provide additional possibility to find the trapped victim. The high frequency sound could be included in the emergency application initiated by the emergency button.

Reference to Prior Arts:

U.S. Pat. No. 6,807,564, entitled "Panic button IP device", describes a device for requesting emergency assistance having a built-in panic button that may be implemented in hardware or software. The device may be in a wearable configuration so that the user in need of emergency help can carry the device on the user's person, or the device may be located at a fixed location accessible by the user. Activation of the panic button by the user results in the device automatically transmitting one or more TCP/IP messages over the Internet e.g., via Internet e-mail, with the device (and, hence, with the user) prior to dispatching emergency help. The resources of the Internet may thus be advantageously harnessed to allow users to request emergency help.

Clearly an internet and cellular communication must be existing, and as prove already in emergency they will not be working, so it is not practical and not an answer and for sure not as to the disclosed innovation.

U.S. Pat. No. 6,636,732, entitled "Emergency phone with single-button activation", describes an emergency-use-only cellular phone provides for contacting and establishing full duplex voice communication with emergency personnel at an emergency response center with the press of a single activation button. When the activation button is pressed a first time, the following functions are initiated: (1) electrical power from a power supply is provided to a cellular transmitter and receiver, (2) the cellular receiver is activated to search for an available channel from among A or B cellular system channels, (3) an emergency telephone number is accessed from memory, and (4) the cellular transmitter is activated to establish communication with the emergency response center.

Since all of these functions are need communication to be available include cellular communication it is not practical and are not as the disclosed innovation.

U.S. Pat. No. 6,535,127, entitled "Panic alert for cellular telephone", describes an integrated electronic apparatus including a personal electronic device other than a personal alarm. A personal alarm is integrated with the personal electronic device. A battery is electrically coupled to the personal electronic device and the personal alarm so as to provide electric power to both the personal electronic device and the personal alarm.

Clearly additional device add-on that need to additional of cellular phone and needed cellular or other communication infrastructure to be exist, for sure not as the disclosed innovation.

U.S. Pat. No. 6,340,928, entitled "Emergency assistance system using Bluetooth technology", discloses "an emergency assistance system (10) that transmits vehicle and occupant information to an emergency station (26) in the event of a vehicle crash condition. The system (10) includes a vehicle crash sensing system (40) that senses the vehicle crash condition and transmits a crash signal through a first port (42) using Bluetooth™ technology. A cellular phone (12) having GPS (30) receives the crash signal through a second port (32) using Bluetooth™ technology, which in turn is coupled to a controller (16) within the cellular phone (12)."

Clearly the above described emergency assistance system is used during a car crash and mandates cellular phone communication. The Bluetooth portion of the system provides an interface between the phone and the other device, not as the disclosed innovation when the disclosed invention uses the signal as a beacon and not to establish real communication or to transfer data, clearly not as the disclosed innovation.

United States Patent Application Publication number 2001/0026223, entitled "Assisted personal communication system and method", discloses a personal communications system which may be used for a variety of emergency and non-emergency situations using two-way communication devices and a bidirectional communication network. In one application two-way pagers are adapted for use in the system. In one application cellular devices are adapted for use in the system. In one application an assisted living response center is established using various embodiments of the present personal communications system. The system provides multiple levels of prioritization. One embodiment provides a method for receiving, evaluating and responding to calls received from a subscriber.

Clearly cellular or two ways communication needs to be establishing, not as the disclosed innovation.

U.S. Pat. No. 6,072,396, entitled "Apparatus and method for continuous electronic monitoring and tracking of individuals" discloses an apparatus and method of monitoring mobile objects or persons using the Global Positioning System (GPS) satellites and cellular telephone communications. The apparatus may include first and second remote units adapted to be worn on the monitored person or object. These remote units would comprise the position and data sensors as well as the transmitter device; the system is also adapted to monitor persons in hazardous environments such as radioactivity or poisonous gases or even to monitor inanimate objects such as automobiles.

Clearly additional device needed and not as to the disclosed innovation.

U.S. Pat. No. 5,971,921, entitled "Medical alarm system and methods", discloses several exemplary monitoring systems and methods for their use. In one exemplary method, a person is provided with a transmitter having an actuator. The actuator is operated to transmit a wireless signal of about 900 MHz the signal from the transmitter is sensed with a receiver/caller unit which sends a digital signal over a telephone line to a monitoring center.

Clearly additional device 900 MHz device and not as the disclosed innovation.

U.S. Pat. No. 5,838,237, entitled "Personal alarm device, a self-contained personal alarm device capable of signaling its location to a remote site such as a security station", disclosed a personal alarm device which includes a housing enclosing a controller, an antenna, a cellular transmitter and a cellular receiver. The controller controls the transmitter and the receiver to receive position location signals such as Global Positioning System signals (GPS), establish a cellular connection with a remote site, and transmit device location data to the remote site on the cellular connection, wherein the device location data indicates the location of the device. The cellular connection is established via a cellular telecommunication network that includes an array of cell base stations. The GPS signals are transmitted to the device over the cellular network by providing each cell base station with a Differential Global Positioning System (DGPS) receiver. Using the DGPS receivers, GPS signals are repeated over the cellular network.

Clearly you need the cellular communication to be working and there is add-on device clearly not as the disclosed innovation.

U.S. Pat. No. 5,771,001, entitled "Personal alarm system", discloses a new Personal Alarm System for detecting whether a person is in an emergency situation by measuring blood pressure, pulse and temperature, and thereafter transmitting such information and location through cellular relay stations.

Clearly cellular communication are needed and add-on system and for sure not as the disclosed innovation.

U.S. Pat. No. 5,742,233, entitled "Personal security and tracking system", discloses a signaling system comprising a portable signaling unit, a remote alarm switch device, a central dispatch station, and a wireless communication system such as a cellular or telephone system, etc., and a GPS or alike system. The portable signaling unit and the remote alarm switch may be adapted to be worn at different locations on the person's body. The portable signaling unit sends a data transmission which includes its location to the central dispatch station. The portable signaling unit also has manual alarm trigger capabilities so it can be used without the remote alarm switch unit. The central dispatch station receives the data transmission and accurately displays the user identification, stored personal information, nature of the alarm. In addition, the location of the portable signaling unit is superimposed on a digitized map at a position corresponding to the location of the person wearing the portable signaling unit. The portable signaling unit can be remotely activated from a central dispatch station to determine and monitor the location of the portable signaling unit.

Clearly add-on unit needed as well as communication to be establishing, not as the disclosed innovation.

U.S. Pat. No. 5,712,619, entitled "Global positioning system personal alarm", discloses a new Global Positioning System Personal Alarm for providing a personal alarm system in the event of an assault, a power source electronically connected to the global positioning system, and a cellular phone system electronically connected to the global positioning system.

Clearly add-on device and GPS needed, not practical and not as to the disclosed innovation.

U.S. Pat. No. 5,652,570, entitled "Individual location system", discloses "An interactive individual location and monitoring system includes a central monitoring system for maintaining health, location, and other data with respect to an individual. A watch unit carried by the individual receives medical and other information selected by and inputted directly from the individual. The watch unit broadcasts the medical and other information locally by radio in a region near the individual. A belt worn pod, etc.

Clearly need an add-on device, belt pod to ware and not the mobile phone as to the disclosed innovation.

U.S. Pat. No. 5,568,535, entitled "Alarm system for enclosed area", discloses an alarm system for protecting premises comprises a fully integrated, alarm detecting cellular phone unit which is linked to various sensors in order to detect the sensor outputs. The cellular alarm unit includes, in addition to cellular phone functions, a formatter or processor for generating an emergency signal on detection of a sensor output, the emergency signal including information on the type of emergency detected . . . . Cellular connection to a remote monitoring station. The connection is wireless at least from the premises to a local cell site. Once connection is established, the emergency signal is transmitted to the monitoring station via the local cell site.

Clearly cellular as well as add-on wearable device need, not as the disclosed innovation.

U.S. Pat. No. 5,305,370, entitled "Personal emergency response communications system", discloses "a personal emergency response system in which a hand held portable transmitter (12) activates a base unit (14) interfaced with the telephone network (16) to dial 9-1-1 and permit direct communications with the operator (18) at the public safety answering point even though the user (10) is unable to reach a telephone (36). The transmitter (12) activates the base unit (14) as well as optional remote units include speaker-phone communication capabilities which permit two-way communications between the user (10) and the 9-1-1 system operator (18)."

Clearly add-on and need communication and not as the disclosed innovation.

U.S. Pat. No. 5,195,126, entitled "Emergency alert and security apparatus and method", discloses a telecommunications system which includes a 911 and voice message service platform for providing such services as telephone answering, voice mail and call completion. An emergency/safety notification system is incorporated and includes a monitor/router device passively connected to the 911 trunk to detect number identification signals.

Clearly not as the disclosed innovation as need communication that prove to be down so it is not practical and not as the disclosed innovation.

U.S. Pat. No. 4,491,970, entitled "Portable transmitter for emergency alarm system having watertight enclosure", discloses a small portable radio transmitter unit which can be worn on the wrist or suspended from a neck chain.

Clearly not as the disclosed innovation as it depends on add-on device.

U.S. Pat. No. 5,873,040, entitled "Wireless 911 emergency location", discloses a system arrangement and method for determining a location of a wireless mobile unit involved in a call for public emergency assistance (e.g. a "911" call). The system is cost-effective in that it makes extensive use of existing telecommunication infrastructures, and does not require either special hardware or software at either the mobile unit site or the emergency assistance center handling a call. The system features shared use of a computer and specially defined database among a plurality of mobile switching offices serving a larger plurality of mobile base stations, the latter serving an even larger plurality of antenna and transceiving sites within predefined cellular regions. Signal strength measurements at the base stations are passed through the switching offices to a shared computer.

Clearly there is network of station, computers or mobile switch needed to operate and for sure not as the disclosed innovation.

Most if not all prior patents and applications use the cellular communication network or other communication to communicate with the user as cellular phone. The present invention uses the cellular phone, not in a capacity as a cellular phone, but as a device that is popular to be carried by most people wherein the user can use the device to signal existence and to be located using the signal from the cellular or mobile phone as a beacon and not as a cellular phone capability. It is practical to say that as of now with all the emergency and the disasters events that effect even huge advanced technologies countries like US and recently Japan, no such innovation as it is suggested herein exists in the market or is currently being used accordingly.

Any suggestion to use the cellular communication in the events of emergency and or disaster prove to be not practical, from the battery drain problems to the failure of the communication infrastructure, any patents and application that based on GPS and or Cellular communication include text messaging. This is proven again and again, that cellular communication is not practical to be used in emergency.

It is believed that the disclosed innovation proves to be deferent, and designed for such environments and conditions where and when there is no infrastructure or when the cellular infrastructure is damaged or failed. None of the prior art identified herein tries to solve the problem from the user stand point, the battery power, and from the search and rescue stand point, more specifically, the scanning ability.

In all, the disclosed innovation proves to be unique as it takes the mobile phone and uses it, not as a mobile phone, and not as it design, but using all the capability of the device to be use in emergency to increase the chances of the user to be located in a case of an emergency and/or disaster situation where and when no other communication will be available.

The disclosed innovation is based upon the following facts:

Mobile phones are the most carried device by any "user" globally.

GPS and the existing locating method depend on cellular communication and most likely will not be available in an emergency situation.

There is a great need for more accuracy outdoors and indoors.

GPS and cellular networks can't provide the accuracy needed, or the availability indoors/outdoors in an emergency or disaster situation.

Bluetooth is the most used communication method today, and it is integrated into almost all mobile phones used today.

Bluetooth has a way to recognize other Bluetooth devices in the close proximity.

Most of the technology already exists.

The present disclosure is based upon direct communication between the Bluetooth beacons to the "user" cellular phone without the need of the Cellular network or GPS. In reality, there is no real communication between the scanner and the handset.

Privacy: the user is in complete control, he must push the emergency button to initiate the emergency/help/panic button and enter into the emergency mode, will eliminate any privacy issue as the user asks to be located.

Options:

The application method can also be use for non emergency where and when there needs to preserve battery power and the application will determine that signal is low or weak and will initiate the same method as in emergency, most like to shut off the scanning done by the mobile phone for available signal, that drain the battery faster-create profile to be used to preserve battery power.

The application method on the user mobile will initiate the emergency mode when:

Signal indicators find no signal for x amount of time and/or power indicators are low, then Shut off cellular communication or go to "airplane" mode for "x" amount of time, Turn on communication signal (Bluetooth and/or Wi-Fi and cellular signal) for "x" amount of time, bring phone from airplane mode to "x" amount of time.

In all, making the mobile phone a beacon-like operation to preserve battery power.

Make a profile, more specifically, an emergency profile, to be encoded into the Bluetooth and Wi-Fi naming packet to enable decoding of the identification or emergency profile by the scanning device.

The disclosed unique method includes the user's side mobile application designed especially for emergency situations where and when the cellular communication has failed or is damaged as well with other normal infrastructure, like electric power.

The mobile application will allow the mobile phone to enter into a beacon like mode to preserve the mobile phone battery as well as encoding the user ID into the handset naming to recognize or identify the user again without the need for cellular communication or any other communication method. The emergency scanner, a sensitive scanner, is designed to pick up relatively weak signals coming from the mobile phone handset, either as a cellular signal, a Bluetooth signal, or a Wi-Fi signal; pinpoint to the location; and allow decoding the user ID to identify the victim/trapped person.

The disclosed unique method makes the mobile phone act as a beacon, and will allow the trapped person/victim to preserve the mobile phone power at least 4 times over normal operation; will allow a trapped person/victim a sign of life; and a way to be found, even a few days after emergency/disaster event.

Location methods:
Four types of methods are used:
Proximity Detection (PD),
Received Signal Strength (RSSI),
Time of Arrival (TOA), and
Angle of Arrival (AOA).

Triangulation: Triangulation takes PD a step further, in the sense that it is based on measuring the signal level measurements from each antenna (possibly by using a triangulation mechanism), with respect to the scanning device receiving antennas. Following that, the mobile phone is located by using a triangulation algorithm.

Why use Bluetooth for indoor location?
Bluetooth has some advantages in the context of indoor location, These include:
Bluetooth uses RF—in the 2.4 GHz ISM band,
Specifically, in this frequency range, the radio waves penetrate obstacles, such as walls and human bodies.
Bluetooth is a low power technology compared to other communication methods.

In contrast to Wi-Fi, Bluetooth uses much less battery power than Wi-Fi, which can drain your mobile or cell phone's battery in as little as an hour of use.

Bluetooth radio waves bounce off walls too. A staircase between stories or even a small gap between a debris will allows the signal to go up from one level to another, even in steel reinforced concrete building.

Bluetooth is a dominating technique for wireless communication; it has low power consumption, drawing only 0.3 mA in standby mode. This enables maximum performance longevity for battery powered devices.

During pauses or at lower data rates the drain would be lower.

The first hours after the disaster or emergency events are particularly critical. Many survivors who survived the event itself were in damaged area, but some could not receive medical treatment or be extracted out of the area of the disaster because the exact location was unknown.

Disabling the disaster network physical infrastructure damaged due to overload on those who survived, prevented those injured in the same area not only connect with their loved ones outside the disaster area, but also with search and rescue forces found their way to care for them. In some cases potential may be extracted Corkscrew found a few dozen yards apart, but in terms of visibility and noise prevented them from noticing each other.

Beacon mode broadcasts or operates at constant time interval, the main design to preserve battery power 4-5 times than normal operation.

Standby Time: Standby time refers to the amount of time you can leave your fully charged cellular portable or transportable phone turned on before the phone will completely discharge the batteries.

Talk Time: Talk time refers to the length of time you can talk on your cellular portable or transportable phone without recharging the battery. The battery capacity of a cellular portable or transportable is usually expressed in terms of so many minutes of talk time or so many hours of standby time. When you're talking, the phone draws additional power from the battery.

Electromagnetic Energy: Electromagnetic Energy refers to the waves of electrical and magnetic energy moving together through space. Electromagnetic Energy can also be called electromagnetic radiation.

The scanning can also scan for the electromagnetic radiations field generated by the cellular when looking to establish communication, or when you can't find the antenna, the exact situation in a disaster.

Sleep Mode: Sleep mode is a mode of operation that is designed to conserve battery life, this mode automatically turns off a terminal after it has been unused for a specified period of time. The unit is reactivated when the keypad is touched.

Beacon: A beacon is an intentionally conspicuous device designed to attract attention to a specific location.

Beacons can also be combined with additional information or Identification to provide important information, such as user ID or emergency information like blood type or medical information, when used in such fashion; the mobile phone can save life.

In a beacon mode the mobile will transmits a periodic signal with limited information content (for example its encoding identification), on a specified radio frequency available in the mobile phone, including: cellular, Bluetooth and Wi-Fi.

Designed to transmit as a beacon in the event of an emergency, the mobile phone/emergency beacons will broadcast a unique identification signal that can be scanned and be decoded and aid in finding the exact location of the transmitter/mobile phone.

When activated by the user, the mobile phone/beacon mode will broadcast a signal that, when detected by special scanning4life sensitive scanner can be located by triangulation. The mobile phone/beacons can have a uniquely identified instantly via encoding the naming, and furthermore, a last GPS position can be encoded into the signal (thus providing both instantaneous identification & position.) The signals from the beacons are homed by Search and Rescue (SAR) ground search parties or even from the air that in turn come to the aid of the concerned persons.

One of the options is to add to the mobile phone/beacon the ability to generate high frequency sound that can detect and alert the search and rescue dogs and the scanning4life scanning device and provide additional possibility to find the trapped victim, the sound will be part of the emergency application initiated by the emergency button.

The application can be integrated or as add-on to the Applicants recently awarded patent referred to as Nav4emergency (U.S. Pat. No. 7,924,149, issued on Apr. 12, 2011), which is incorporated herein by reference:

"Providing emergency procedure and mapping according to user location, emergency information can reside on user mobile as a standard procedure for current occupants.

Providing digital emergency guidance . . . ."

The basic purpose of the disclosed innovation is to increase the chance and "open window" to get people rescued within the so-called "golden day" (the first 24 hours following a traumatic event) when the majority of survivors can still be saved or found alive.

Using the disclosed method to preserve battery power and beacon like operating can increase the "Golden day" the window of opportunity to find the victims and save them, it can save lives.

SUMMARY OF THE INVENTION

In accordance with the present invention, these are the disclosed project's characteristics:

According to one aspect of the invention, it provides a system and method for use in emergency and disaster situation where the cellular or other communication infrastructure is damaged or failed.

According to another aspect, it provides a method for providing the mobile user an emergency application that will initiate by the user to encode emergency ID and additional emergency information like blood type into the mobile phone, the emergency naming will be broadcasted by the mobile phone via Bluetooth or Wi-Fi to be picked up by the search and rescue scanning4life scanner device.

According to yet another aspect, it provides a method to apply to the user in an emergency situation to preserve their mobile phone battery by entering the mobile phone into a beacon like mode, a way to save battery power and increase usage of the mobile phone device in an emergency; it can save a life.

According to yet another aspect, it provides a method to apply to the victim in an emergency or disaster situation to increase their chance to be found alive by using their mobile phone in the special emergency mode.

According to another aspect, it provides a method for providing the search and rescue and other emergency personal with add-on tool to scan detect and locate trapped victim or people needing help in an emergency by scanning and locating the most carried-on device in the world today: the user's mobile phone.

According to another aspect, it provides method for providing the search and rescue and other emergency personal the tools to ID people trapped or needing help from a distance, with the victim's emergency information detected and them located.

According to another aspect, it provides a method for providing the search and rescue and other emergency personal to scan, detect, and locate people in an emergency without the need for cellular or other communication infrastructure that most likely are damaged or failed.

According to yet another aspect, it provides a method to increase the chance and "open window" to get people rescued within the so-called "golden day" (the first 24 hours following a traumatic event) when the majority of survivors can still be saved or found alive.

BRIEF DESCRIPTION OF THE DRAWINGS

A better understanding of the present invention may be obtained by reference to the accompanying drawings, which should be considered in conjunction with the detailed description, all in accordance with the present invention.

DESCRIPTION OF THE PREFERRED EMBODIMENT

In all the figures of the drawings, sub-features and integral parts that correspond to one another bear the same reference symbol.

Referring now to the drawings in detail and first particularly to FIGS. 1-6 thereof.

These figures illustrate the method and system to provide first responder or emergency team a new method to find victims in disaster or emergency situation and the method for the mobile user to increase his chances to be found alive.

Figure 1:
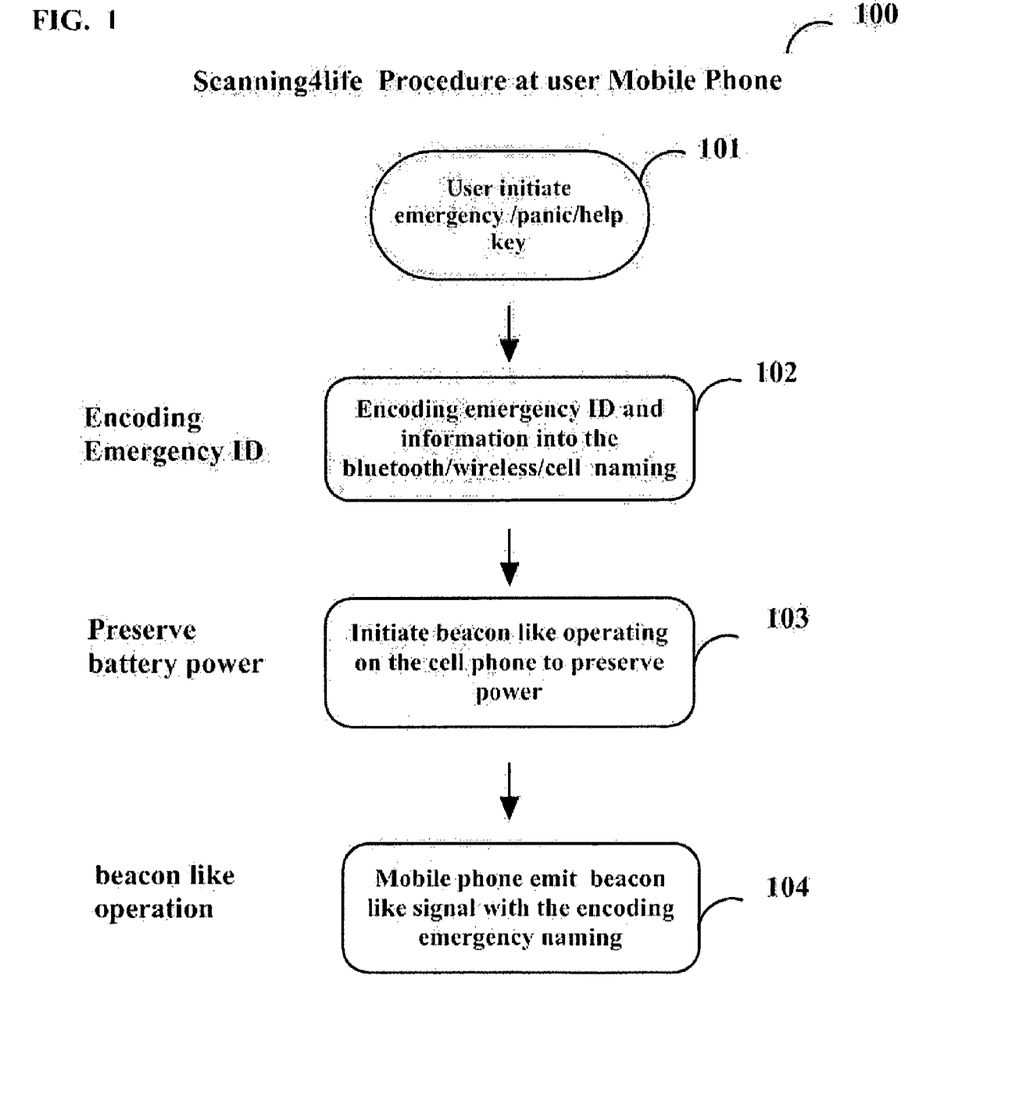
FIG. 1 is a flow diagram representative of a work flow procedure at the user mobile phone in accordance with the present invention.

Turning to FIG. 1, the drawing illustrates a procedure associated with a scanning4life or emergency scanning and locating application on the user mobile phone 100, by pressing on emergency key icon 101 the user initiate emergency/panic/help, as part of the emergency application an emergency ID is encode into the Bluetooth and/or Wi-Fi and cell naming 102. The information is encode into a code that can be recognize and decoded by the search and rescue team in case of emergency, such emergency ID 102. The information may also contain blood type or other important medical information that can assist the user if the user needs help medical help in the emergency. The encoding is a done by the user when he sets up the emergency application during the first time access on his mobile phone 100 using a template that will allow storing and encoding the emergency information only when the emergency application was trigger by the user. Another component of the application is to preserve the mobile phone power by initiate a beacon-like operation 103, on the mobile phone 100. Instead of operating all time the beacon mode 104, The application will effectively put the mobile phone into operating condition like in an "airplane" mode where all possible communication will be shut down for "x" amount of time and then turn off the "airplane" mode to get the mobile phone use the built in Bluetooth and or Wi-Fi or cellular to be on for "x" amount of time and vice versa. The idea is to use the existing communication signal available on the mobile phone to be located by a scannig4life scanning device 200 held by search and rescue unit in the emergency situation. The beacon mode 104, can be setup in interleave time and can be setup to include only part or few of the communication signal that can emit by the mobile phone, the beacon mode 104, main idea is to preserve the battery of the mobile phone in such environment in emergency where and when most likely the cellular infrastructure will be damaged or will fail. The result at the user mobile set 100 in a cellular infrastructure down condition, is increase of the search for signal by the mobile unit and a fast draining of the mobile phone battery in such time and place where it can be life saver.

Figure 2:
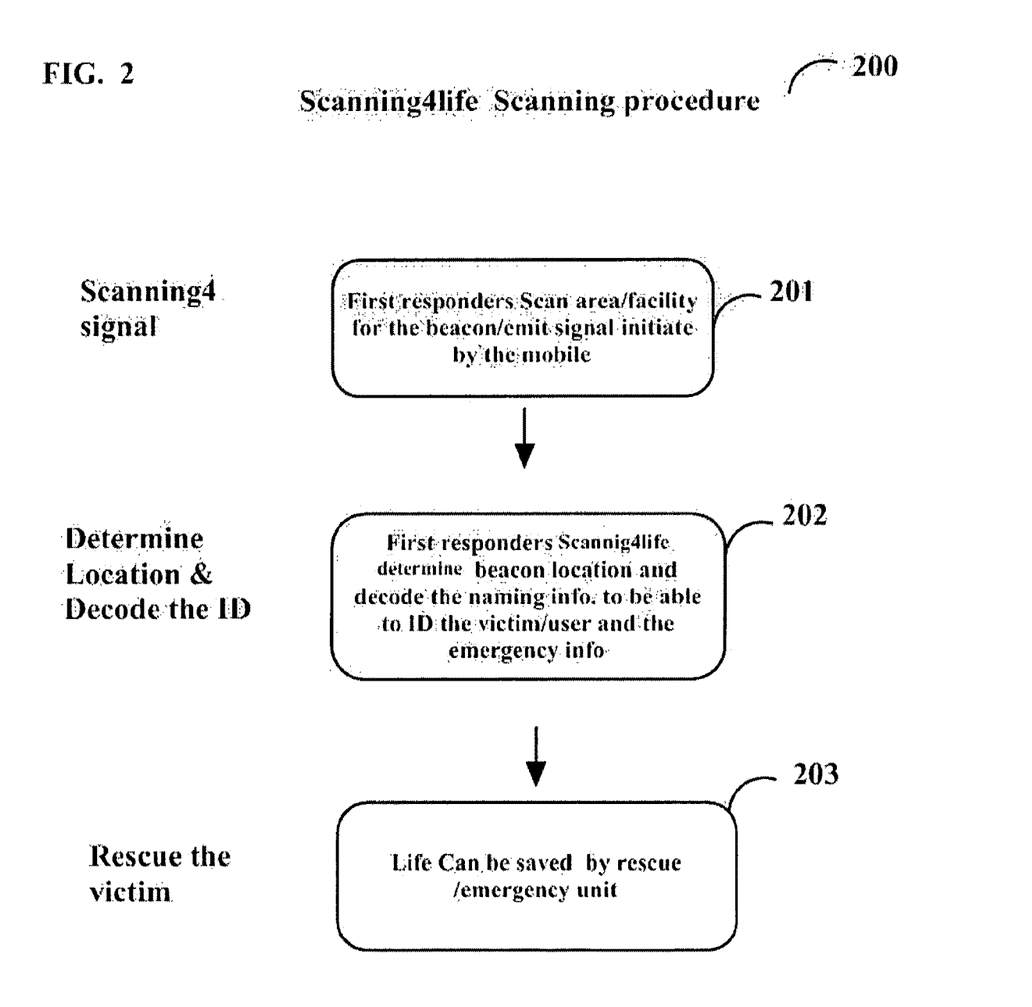
FIG. 2 is flow diagram illustrating steps representative of a detecting and locating procedure used by search and rescue or emergency personal.

Referring to FIG. 2, the drawing illustrates a flow diagram detailing a scanning4life or emergency scanning and locating procedure 200. The scanning procedure 200 is used by the emergency personal searching to help and find the mobile user 100. A first responder emergency personal 201 will use a scanner to scan the area/facility designated as an emergency or disaster area, wherein the scanner searches for the beacon/signal initiated by the user mobile phone when the emergency button 101 is triggered, initiating a broadcasting emergency signal. The broadcasting emergency signal is a Bluetooth and/or Wi-Fi, or cellular signal with the encoding naming 102, the first responder or search and rescue scanner will scan and determine beacon location 202 and decode the user ID of the mobile phone victim 102 to able to identify the person even before the rescue team rescues him. The process also can aid in identifying the missing persons where abouts and pinpoint the rescue team to have him rescued 203. The direction and locating of the mobile signal can use triangulation to find the exact location. The operation of the beacon 103 can include a high frequency sound generate by the mobile phone and attached to the signal emit from the mobile phone in addition to the Bluetooth and/or Wi-Fi or cellular signals to be heard by the sensitive rescue dogs and received by the scanning unit from a long range.

Figure 3:
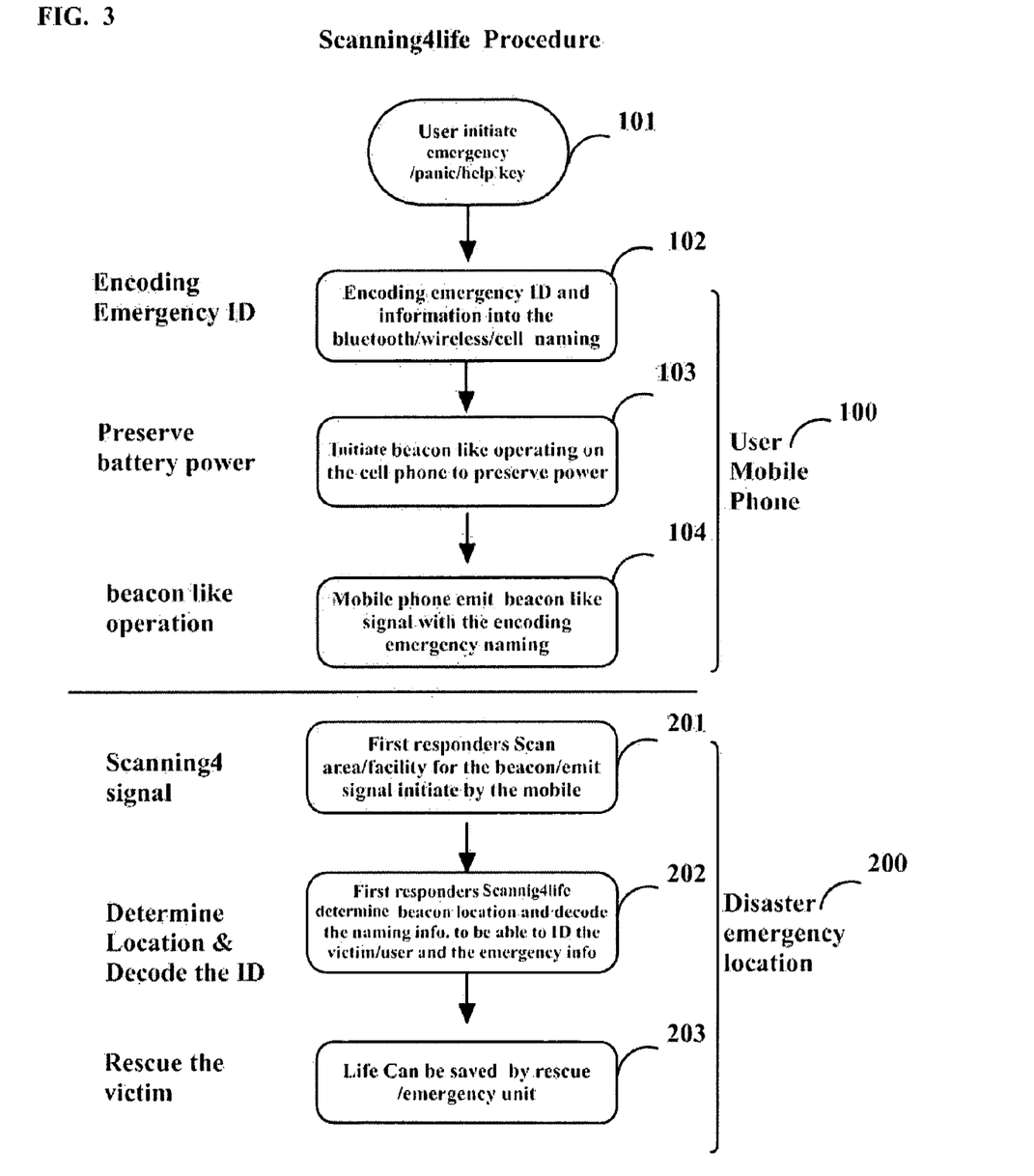
FIG. 3 is flow diagram illustrating steps presenting a full procedure deployment and use.

Turning to FIG. 3, the drawing illustrates a flow diagram representing a complete scanning4life or emergency scanning and locating procedure as describe in FIG. 1 and FIG. 2.

The scanning4life procedure flow diagram describes all the steps of the user emergency application at the user mobile phone 100, that initiate 101, the emergency/panic/help key, and that allow 102, encoding emergency ID into the mobile phone naming to be broadcast via Bluetooth and or Wi-Fi or cellular signal by way of beacon mode 103, to preserve the mobile phone battery, the mobile phone will broadcast 104 the signal with the encoding emergency ID. This will allow the search and rescue or emergency unit to perform scanning in the disaster/emergency area for the beacon signal initiate by the user 201. Upon detecting such a signal, the Bluetooth signal and/or the Wi-Fi signal or the cellular signal emitted from the mobile phone in the beacon mode, the first responder or emergency personal 202 will determine the location of the beacon/mobile 100 and decode the user's emergency information 102 using the decoding scanner 202. Once the signal is received and decoded, the mobile user can be rescued 203.

Figure 4:
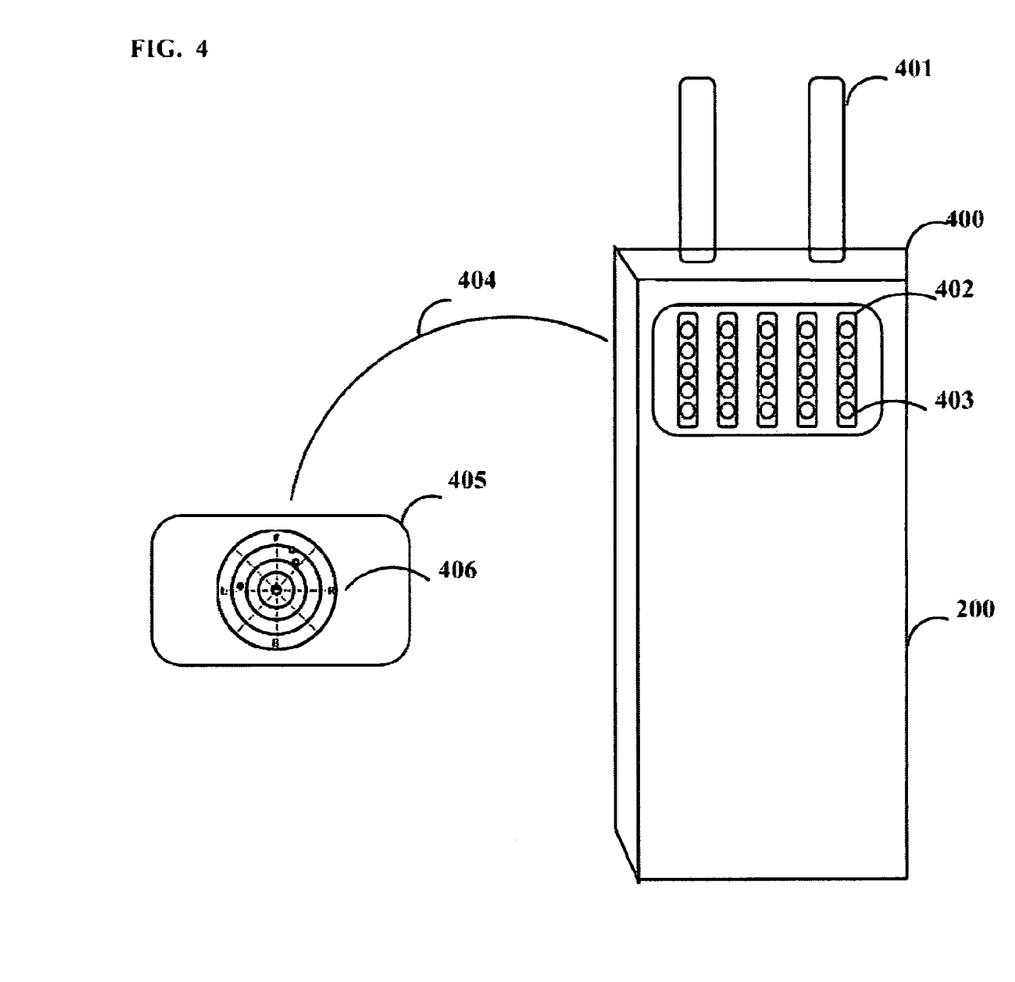
FIG. 4 is an isometric view of an exemplary scanner for use in an emergency scenario in accordance with the present invention.

Referring to FIG. 4, the drawing illustrates the scanner 400 used for the scanning4life scanning process. More particularly, the scanner 400 is used to scan an area designated as the emergency or disaster area, search for the emitted signal broadcasted from the mobile phone in the beacon mode. The scanner 400, contains a sensitive scanning unit that allow scanning of the cellular signal 2G and 3G cell phone signal emitted from the mobile phone, as well as scanning for the Wi-Fi beacon signal and the Bluetooth beacon signal, seeking detection using a scanning band of 900 Mhz-5.8 GHz, GSM, AMPS, PHS, PCS, WCDMA (European), CDMA (USA), 50 Mhz-6 GHz, with a detection distance of up to 100M. The scanning unit includes high quality sensitive antennas 401 and possibly includes a Global Positioning System (GPS) for direction finder when finding and locating the signal. The scanning4life device 200 includes a built-in rechargeable battery with an option to connect to externally provided A/C or D/C power. The scanner includes a Liquid Crystal Display (LCD) to show the signal in a bar like graphics with 10 segments, each for accurate location of the RF sources. Each graph represents a signal source like Bluetooth, Wi-Fi, GSM, etc. The scanning device 400 can be a portable hand held format or in a portable case. The scanning can be done from a car, by a person, or even from the air using a helicopter or unman drone. The scanner can also be used to detect high frequency sound generate by the mobile phone emergency application 100, wherein the high frequency sound is design to attract rescue dogs or be detected by the scanning unit 400. The detect signal the scanning unit 400 can also use an external screen 405 or computer unit connected 404 to the scanning unit 400 as an output display. The output can include a location of the signal represent a mobile phone beacon that initiate emergency signal, which can be shown in a practical way on the circle. The output can include additional information obtained from the mobile phone beacon signal. People that don't have the emergency application and/or didn't initiate the beacon signal most likely will not be found by the disclosed method. Most likely, the mobile phone will not hold the battery charge and/or the beacon signal will not emit. The disclosed process also solves any privacy issue, as only people that initiate and press the emergency key will have a chance to being located by the mobile phone they carry.

Figure 5:
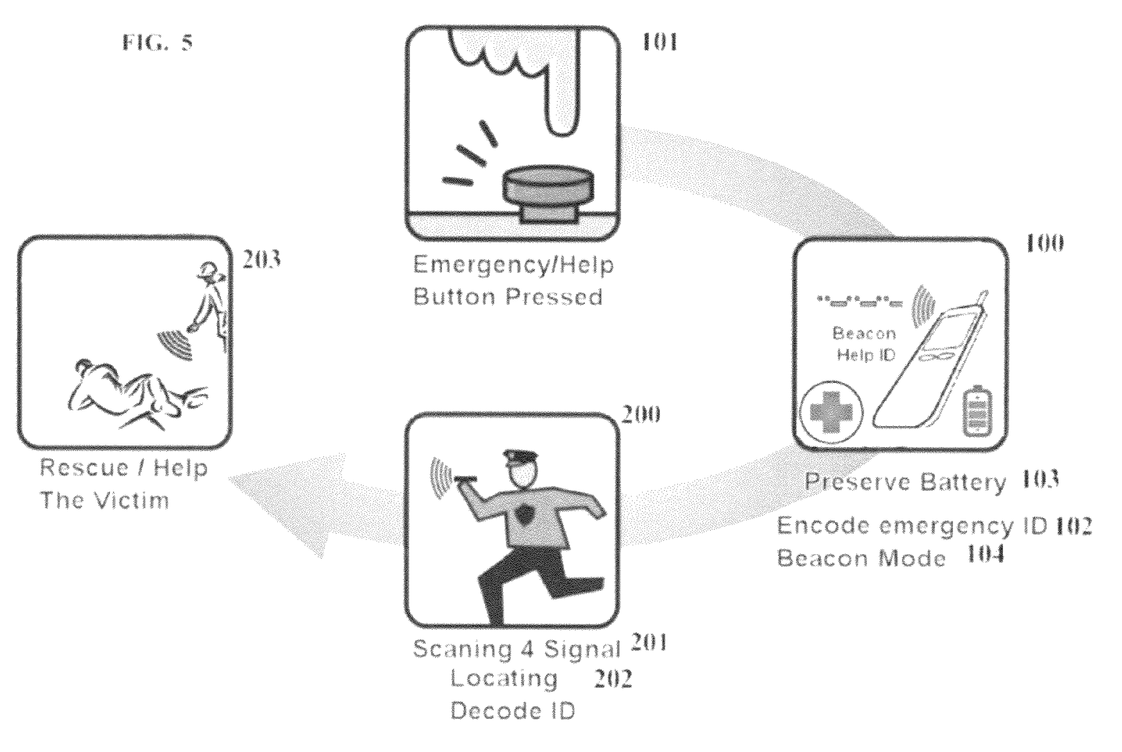
FIG. 5 is a schematic diagram introducing flow between a work system elements.

Referring to drawing FIG. 5, the drawing illustrates a schematic diagram 100 representative of how scanning4life or emergency scanning and locating 300, works: from an emergency/help button was press (step 101) by the user that will initiate procedure (step 100). Procedure 100 includes steps of preserving the battery 103 by entering into beacon mode 104 and encoding an emergency ID and other associated emergency information into the broadcast signal 102. The search and rescue or the emergency personal (step 200) will scan the area for signals and sound emitted from the mobile phone 100, using the scanning4life scanner 201, that locates 202 and decodes the user ID and emergency information to aid in rescuing/helping the victim (step 203).

Figure 6:
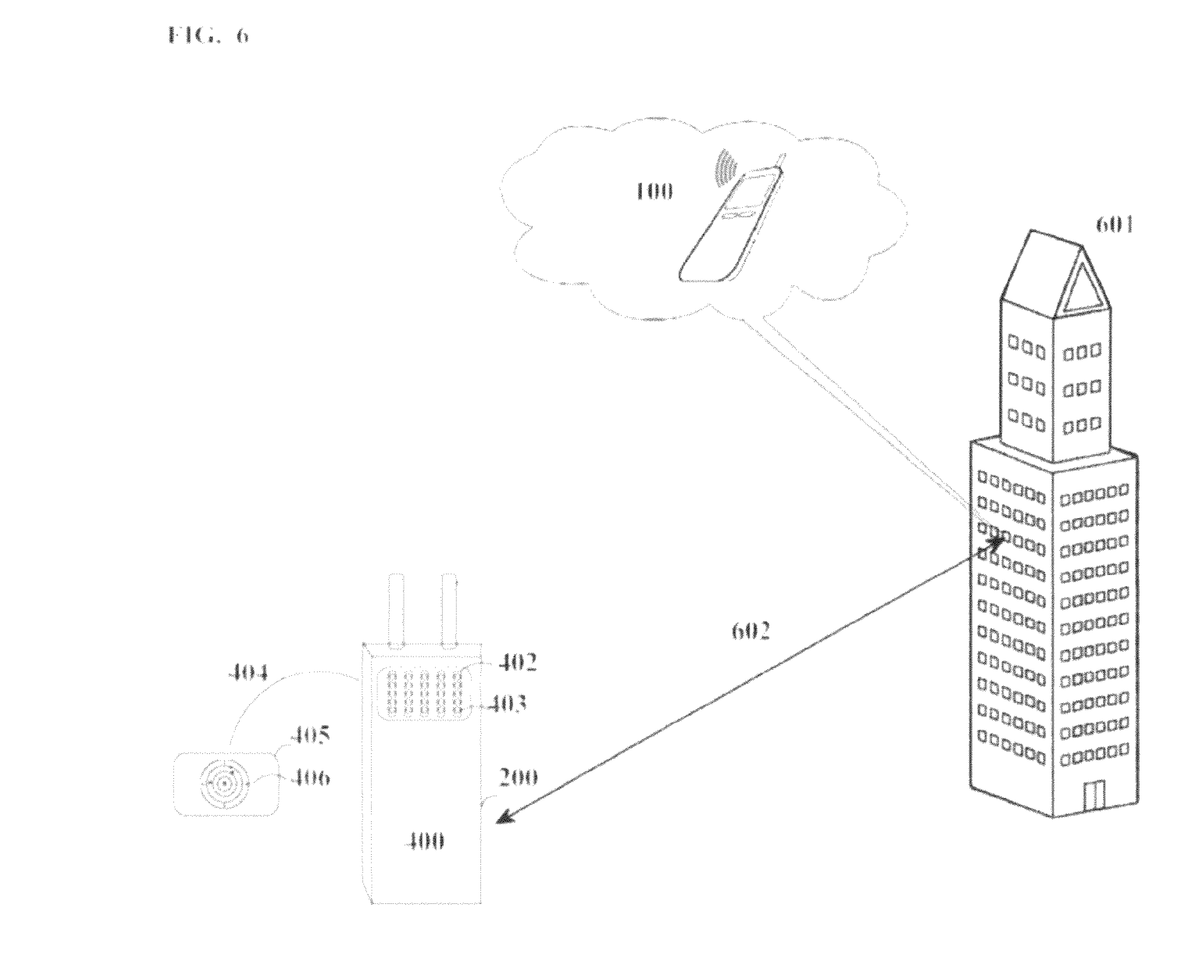
FIG. 6 is a schematic diagram representing an option of using the disclosed emergency locating method to detect and locate people that may need help in an emergency condition.

Turning to FIG. 6, the drawing illustrates a use of the disclosed method in searching for a user initiate an emergency/help/panic button in a building 601 even from outside of the building. In an emergency situation the mobile phone 100 would emit an emergency beacon, which would be scanned from outside by the scanner 200 with the screen 402. The scanned and decoded data 403 would be shown on the screen 402 or on the external computer or screen 405, with a circle 406 that shows the detected devices around the area.

What is claimed is:

1. A method providing a user's cellular phone application software to assist a user during an emergency or disaster situation, wherein said application software increases a probability of being located and getting help from search and rescue or emergency personal, the method comprising steps of:

determining an emergency condition, where a user and said user's cellular phone are located within a region wherein cellular communication is at least one of void and inoperable and said user desires to emit a signal to be located;

initiating emergency alert application software on said user's cellular phone, wherein said application software encodes emergency identification information into at least one of (a) a naming portion of an encoded Bluetooth emergency signal in accordance with a Bluetooth protocol and (b) a naming portion of an encoded Wi-Fi emergency signal in accordance with a Wi-Fi protocol;

initiating a beacon operating mode of said user's cellular phone to preserve battery power, wherein said beacon mode emits and broadcasts a signal with said encoded emergency identification, wherein said emergency broadcasting beacon signal is at least one of a repeating unidirectional Bluetooth beacon signal and a repeating unidirectional Wi-Fi beacon signal;

scanning an area using a scanning device designed to scan an emergency or disaster area to directly detect and locate said repeating emergency broadcasting beacon signal emitted from said user's cellular phone;

detecting and decoding repeating emergency broadcasting beacon signal emitted from said cellular phone user identification to identify said user's cellular phone and associated emergency information; and locating said user's cellular phone by determining an area where said scanning device system emergency beacon signal has detected and located said repeating emergency broadcasting beacon signal emitted from said user's cellular phone and providing said detected and decoded cellular phone user identification and detected location of said user's said repeating emergency broadcasting beacon signal to search and rescue or emergency personal, wherein said naming portion of said emergency signal is received and decoded independent of pairing between said user's cellular phone transmitting said emergency signal and said scanning device.

2. The method according to claim 1, further comprising a step of encoding emergency information into said at least one of user's cellular phone Bluetooth identifier and Wi-Fi identifier to be broadcasted in said beacon mode, wherein said encoding emergency information comprises at least one of blood type, medical information, and critical emergency information to be decoded by said scanning device in emergency or disaster situation.

3. The method according to claim 1, further comprising a step of preserving battery power in emergency situation by placing said user's cellular phone into a beacon mode, wherein all possible communication protocols toggle between being deactivated for a deactive period of time and being active for an active period of time resulting in reduced power consumption.

4. The method according to claim 1, further comprising a step of encoding additional emergency information into said naming portion of at least one of said user's cellular phone Bluetooth identifier and Wi-Fi identifier, wherein said additional emergency information is as a profile to be used in said emergency situation.

5. The method according to claim 1, further comprising a step of using said user's cellular phone as an emergency beacon, said user's cellular phone in said beacon mode emits a broadcast signal as a burst over a predetermined period of time to be scanned, and located by said scanner device system.

6. The method according to claim 1, further comprising a step of emitting at least one of: a sound and a high frequency sound through a loud speaker of said cellular phone, wherein said at least one of said sound and said high frequency sound is generated by said emergency application software.

7. The method in claim 1, further comprising a step of broadcasting a high frequency sound wave, wherein said high frequency sound is broadcast to trigger attention by dogs and said scanning device system, thus providing long range detection and locating of said user's cellular phone.

8. The method according to claim 1, further comprising a step of scanning for a signal being broadcast from said user's cellular phone, wherein said signal includes at least one of said Bluetooth signal and said Wi-Fi signal, an audible sound, and a high frequency sound generated by said beacon mode.

9. The method according to claim 1, further comprising a step of determining a current position of a user by scanning a signal broadcast from said user's cellular phone, wherein the position is determined using a method of triangulation.

10. The method according to claim 1, further comprising a step of performing said step of locating said user's cellular phone indoor or outdoor is accomplished without aid of any of the following: cellular communication and a global positioning satellite system.

11. The method according to claim 1, further comprising a step of establishing a user profile, wherein said user profile is associated with a user operating said user's cellular phone, wherein said user profile can be used to find said user in emergency or non-emergency events.

12. The method according to claim 1, further comprising a step of detecting and locating said user's cellular phone, when said user is in distress or asking for help, wherein said method can be used in any area when and where global positioning satellite system cannot be provided or is not accurate or precise enough to help locate people in an emergency situation.

13. The method according to claim 1, further comprising a step of providing and storing emergency information in a memory device associated with said user's cellular phone, wherein said emergency information is displayed on said user's cellular phone when said emergency alert application software is activated.

14. The method according to claim 13, further comprising a step of providing to and storing within said user's cellular phone, an emergency procedure, wherein said emergency procedure includes at least one of an area map and a facility/building floor plan for emergency use.

15. The scanning device system according to claim 1, further comprising a step of utilizing a scanner to directly detect a Bluetooth signal and a Wi-Fi signal, and sound emitted from said user's cellular phone, wherein said scanner is used by at least one of search and rescue and emergency personal.

16. The method according to claim 15, further comprising a step of detecting and locating a high frequency sound emitted and broadcast by said user's cellular phone, wherein said high frequency sound is utilized to attract rescue dogs.

17. The method according to claim 15, further comprising a step of identifying a location of said user's cellular phone using a global positioning satellite system and embedding said user's cellular phone location within information being emitted with said emergency signal.

18. The method according to claim 15, further comprising a step of decoding a detected, encoded emergency signal emitting from said user's cellular phone using said scanner device system, and decoding said detected, encoded emergency signal emitting from said user's cellular phone;

identifying at least one of said user and said user's emergency medical information based upon information encoded within said emergency signal emitting from said user's cellular phone; and in a condition where said encoded user's emergency signal includes emergency medical information, said emergency medical information is used to provide guidance for proactive treatment during a rescue operation.

19. The method according to claim 1, wherein said emitted beacon signal includes at least one of:
said Bluetooth signal, and
said Wi-Fi signal.

20. The method according to claim 1, wherein said emitted beacon signal includes at least one of:
emergency alert information in a Bluetooth identifier packet of said Bluetooth signal, and emergency alert information in a Wi-Fi identifier packet of said Wi-Fi signal.

21. The method according to claim 1, wherein naming portion of said at least one of said encoded Bluetooth emergency signal in accordance with a Bluetooth protocol and (b) said encoded Wi-Fi emergency signal in accordance with a Wi-Fi protocol is adapted to be dynamically changed.

22. The method according to claim 1, further comprising steps of:
determining a location of said cellular phone by receiving a location signal from at least one location referencing beacon deployed in a vicinity of said user, wherein the location of each of the at least one location referencing beacon is known, wherein said at least one location referencing beacon emits said beacon signal; and
transmitting information to identify said determined location of said user's cellular phone as determined by said location referencing beacon signal transmitted from at least one location referencing beacon.

23. The method according to claim 1, further comprising a step of:
emitting an emergency broadcasting signal with said encoded emergency identification, wherein said encoded emergency information includes said determined location of said user's cellular phone, wherein said emergency broadcasting signal is at least one of (a) a Bluetooth signal; (b) a Wi-Fi signal from said user's cellular phone; and (c) a cellular transmission.

24. The method according to claim 1, further comprising a step of:
emitting an emergency broadcasting signal with said encoded emergency identification, wherein said encoded emergency information includes said determined location of said user's cellular phone, wherein said emergency broadcasting signal is at least one of (a) a repeating unidirectional Bluetooth signal; and (b) a repeating unidirectional Wi-Fi signal from said user's cellular phone.

25. The method according to claim 1 further comprising steps of:
initiating an E-911 call; and
communicating the determined location of said user's cellular phone using the E-911 communication system.

26. The method according to claim 1, further comprising steps of:
assisting in locating said user by obtaining said location of said user's cellular phone from said transmission.

27. The method according to claim 1, further comprising steps of:
assisting in locating said user by obtaining said location of said user's cellular phone from said transmission, wherein the method includes an interaction with an E-911 system.

28. The method according to claim 1, further comprising steps of:
utilizing said location of said user's cellular phone as determined from said at least one location referencing beacon signal as a component of a device locating procedure employed by an E-911 location determining system.

29. The method according to claim 23, further comprising steps of:
emitting an emergency broadcasting signal with said encoded emergency identification, wherein said encoded emergency information includes said determined location of said user's cellular phone, wherein said emergency broadcasting signal is at least one of (a) a repeating unidirectional Bluetooth signal and (b) a repeating unidirectional Wi-Fi signal from said user's cellular phone;
scanning an area using a scanning device adapted to directly detect and locate said repeating emergency broadcasting signal emitted from said user's cellular phone;
detecting and decoding repeating emergency broadcasting signal emitted from said cellular phone user identification to identify said user's cellular phone and associated emergency information; and
locating said user's cellular phone by determining an area where said scanning device detected and located said repeating emergency broadcasting signal emitted from said user's cellular phone and providing said detected and decoded cellular phone user identification and detected location of said user's said repeating emergency broadcasting signal to at least one of search and rescue and emergency personal.

30. The method according to claim 1, further comprising a step of:
utilizing at least one of signal strength and triangulation to increase an accuracy of said location of said cellular phone.

31. The method according to claim 1, further comprising a step of:
including said location of said cellular phone in said unidirectional identifier portion of said repeating emergency broadcasting beacon signal.

32. The method according to claim 1, further comprising a step of:
displaying a circle on a display of the cellular phone, wherein the circle identifies a physical area in a proximity of the cellular phone, wherein said location of said cellular phone is indicated within said circle.

33. The method according to claim 1, further comprising a step of:
displaying an a circle as an overlay a local map that shows detected devices around said area on a display of at least one of said mobile device and said scanning device.

34. The method according to claim 1, further comprising a step of:
initiating an emergency navigation application, wherein the emergency navigation application directs the user to a desired location using location information obtained from said at least one location referencing beacon deployed in a vicinity of said user.

35. The method according to claim 1, further comprising a step of:
initiating an emergency navigation application, wherein the emergency navigation application provides navigation to the user to an exit, wherein the navigation uses location information obtained from said at least one location referencing beacon deployed in a vicinity of said user.

36. The method according to claim 1, further comprising a step of:
providing an emergency procedure to said user.

37. The method according to claim 1, further comprising a step of:
utilizing said location signal from said at least one location referencing beacon to assist said global positioning system in determining said location of said user's cellular phone.

* * * * *